May 1, 1923.
T. J. FAY
AUTOMOBILE BODY MOTION STABILIZER
Filed Dec. 4, 1919
1,453,344
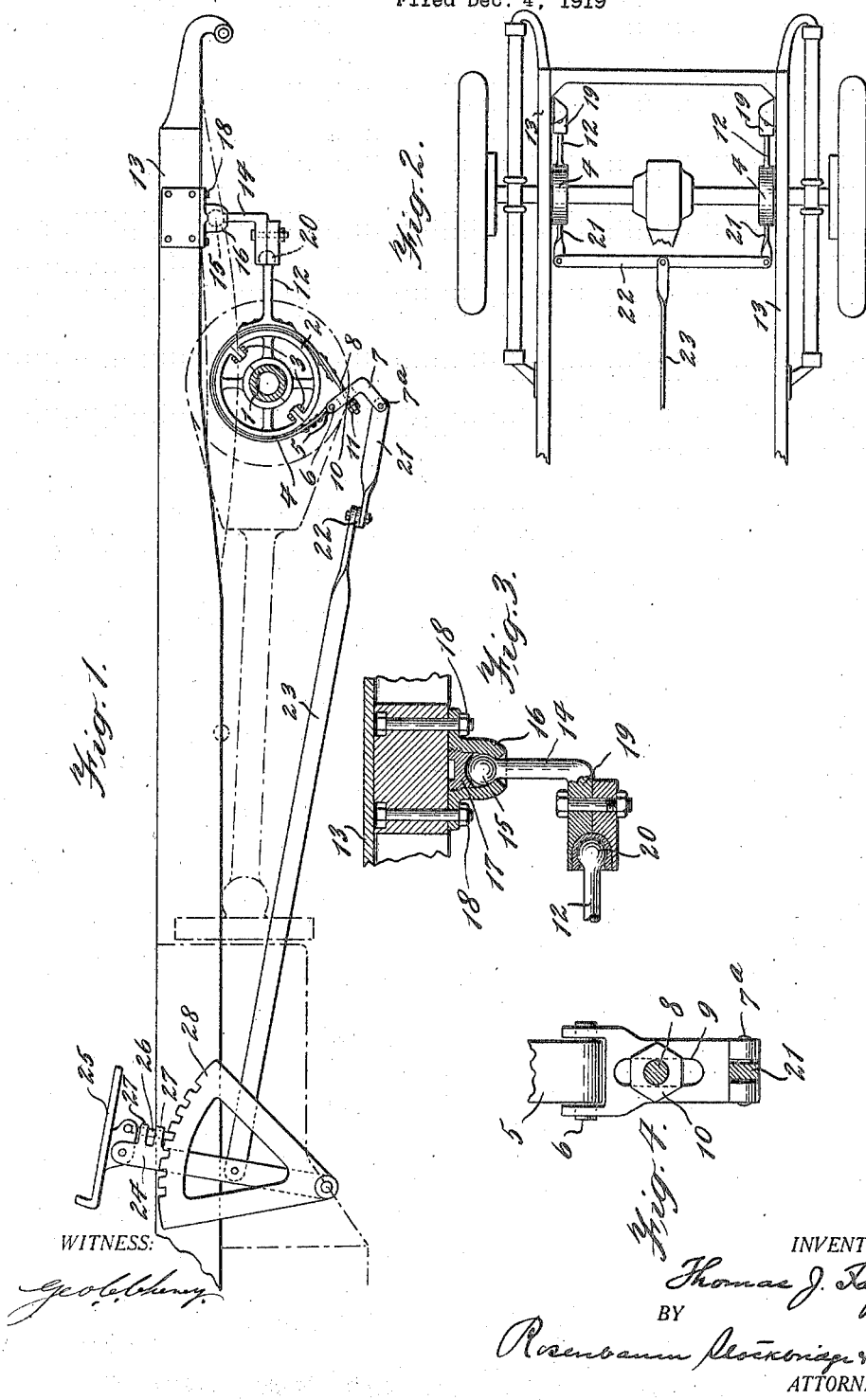
INVENTOR.
Thomas J. Fay.
BY
ATTORNEYS.

Patented May 1, 1923.

1,453,344

UNITED STATES PATENT OFFICE.

THOMAS J. FAY, OF BROOKLYN, NEW YORK.

AUTOMOBILE BODY MOTION STABILIZER.

Application filed December 4, 1919. Serial No. 342,332.

*To all whom it may concern:*

Be it known that I, THOMAS J. FAY, a citizen of the United States, residing at Brooklyn, in the county of Kings and State of New York, have invented certain new and useful Improvements in Automobile Body Motion Stabilizers, of which the following is a full, clear, and exact description.

This invention relates to devices for deadening or neutralizing the rebounds or after movements of the supporting springs of automobile bodies and has for an object the provision of a vibration absorber for the chassis which will be effective in preventing excessive rebound movements of the automobile body without materially interfering with the free action of the springs of the car in absorbing the minor vibrations or shocks created by the passage of the wheels over uneven roadways.

A further object is to provide a vibration absorber which is normally inoperative but which can be easily rendered operative or inoperative by the operator while in the car.

A further object is to provide a vibration absorber whose retarding effect can be varied at will by the operator of the car while riding in it, or set to have any desired retarding effect on the excessive rebounding movements of the car springs.

A further object is to provide a vibration absorber of this type which is simple in construction, inexpensive to manufacture, reliable and certain in operation, and which can be readily applied to existing automobiles without material changes in their present construction.

Other objects will appear from the following description and the novel features of my invention will be particularly pointed out in the claims.

In the drawings:

Fig. 1 is a schematic view illustrating the application of my invention to the chassis of an automobile;

Fig. 2 is a plan of the rear portion of the chassis of an automobile with my invention applied thereto;

Fig. 3 is a section illustrating some of the details, and

Fig. 4 is an elevation of a detail.

Referring now to the drawings:

Upon the stationary rear or dead axle casing 1 of the running gear I provide a pair of drums 2 rigidly secured thereto in any suitable manner. I preferably use split drums, clamped together and upon the shaft by any suitable means such as screws or bolts 3. Extending substantially around the periphery of each drum is a friction or brake band 4 having a looped end 5 for pivotally securing the band to the pin 6 of the lever arm 7. The other end of the band is provided with a threaded extension 8 which extends through an elongated aperture 9 in the intermediate portion of the lever arm, being held against withdrawal therefrom by means of a washer 10 and nut 11. An adjustment of the nut and washer on the threaded extension varies the effective length of the band and serves to tighten it on the drum and increase the friction therebetween.

An arm 12 is riveted or otherwise rigidly secured to the band 4 and extends outwardly therefrom. This arm is connected to the chassis frame or body 13 by means of a universal connection so that vertical oscillations of the frame on the springs will produce corresponding oscillations of the band around the periphery of the drum. The universal connection may conveniently comprise a link 14 having a ball 15 on one end received within a socket member 16, and held against a semi-spherical end thereof by a cap 17 screwed into the open end of the member 16. The member 16 is firmly secured to the under side of the frame in any suitable manner as by bolts 18. The other end of the link has a socket member 19 for receiving a ball 20 on the projecting end of the arm 12 to form a universal joint therewith.

Each lever arm 7 at the end opposite from the connection to the looped end 5 is pivotally connected as at 7ª to a link 21 and the links 21 are in turn pivotally connected to an equalizing bar 22. The equalizing bar is pivotally connected at its intermediate portion to a common operating link 23 which is to be shifted at the will of the operator to vary the friction between the band and the drum. The shifting means for the link is located in a portion of the chassis or body convenient for operation by the operator of the automobile, and may comprise a foot or hand operated member, but for the purpose of illustration I have shown a foot operated construction. For this purpose a pivoted lever 24, to which the link 23 is connected, is mounted in a position convenient for operation by the operator's foot. A pedal or foot engaging member 25 is pivoted to the upper end of the lever 24 and has a locking pin 26 pivotally secured thereto and extending downwardly through guide slots in projections 27 of the lever 24 in position to be engaged with and disengaged from the notches in a toothed sector locking member 28 by a rocking movement of the member 25.

The roadway over which automobiles travel is never a true plane and the body or chassis frame oscillates up and down on the springs as the wheels pass over the uneven surface. The springs normally serve their function in absorbing the shocks by bending or straightening, but often fail of their task when by continued vibration, they break up or distribute the shock in a series of bounds and jolts, unpleasant to the occupants of the car and destructive to the car itself. With an automobile equipped with my device, when the pedal is at the extreme rearward position (to the right in Fig. 1) the band is loose upon the drum and no resistance is offered thereby to the oscillations of the frame 13. When the operator desires to render the device effective, the pedal member is moved forward (which is to the left in Fig. 1) and through the link 23, equalizer bar 22, and links 21, the levers 7 are rocked to tighten the band on the drum. If the pin 6 be considered as the pivot of lever 7, the intermediate portion of the lever will engage the washer 10 and nut 11 to pull on the extension 8 and tighten the band. If the washer 10 be considered as the pivot, the loop 5 will be moved to the right (Fig. 1) and the band tightened. As neither pin 6 nor washer 10 are rigidly fixed there will be a relative rocking on both pivots 6 and 10 to cause a tightening of the band on the drum. Downward movement of the frame 13 as the wheels strike a rut will not be resisted, except by the springs, since the link 14 will, by its connection to the frame and the arm 12, shift the band on the drum clockwise (Fig. 1). The link 21 is held against lengthwise movement by its connection to the pedal, and the lever arm 7 will rock on axis 7ª which will in effect loosen the band on the drum, the link 21 moving downward slightly during the rocking of lever arm 7. When the frame rises again under the force of the springs, the band will be shifted counter-clockwise on the drum and the lever arm 7 shifted about axis 7ª in a reverse direction to in effect tighten the band again. When the frame 13 reaches the normal position for the given load, the band has been tightened to the amount caused by the setting of the pedal, and as the frame continues to move upwardly due to its momentum the band is shifted further in a counter-clockwise direction. This further movement rocks the lever arm 7 about axis 7ª and the washer 10 bearing against the arm pulls loop 5 of the band to further tighten the band on the drum and correspondingly increase the friction between them. The greater the movement of the frame 13 past its normal position, the greater will be the frictional resistance to its movement, due to the frictional resistance to rotation of the band by the frame. The frame will therefore be quickly brought to rest and gravity and the springs will return it to normal position. It will thus be seen that no downward movement of the frame is prevented or resisted, nor any movement upwardly until the normal position is nearly reached. This allows for the free action of the spring in absorbing the minor jars or shocks, and the easy riding due to the normal action of the springs is not materially interfered with. Any movement upwardly past the normal position of the frame for the given load is immediately resisted by a frictional force which increases with the amount of upward movement past the normal position. This causes no abrupt stopping action, such as straps or permanent obstructions would produce, but stops the upward movement past normal by a graduated resistance. By shifting the pedal 25 forwardly, the initial friction between the band and the drum at normal position can be increased, and a rearward movement will decrease the initial friction. A complete rearward movement renders the device ineffective and the riding qualities of the car are not affected. The device can therefore be rendered effective and to any extent by a manipulation of the pedal 25, which can be held in any position by the operator's foot or locked in any position by means of the pin 26 and toothed sector 28. The device can therefore be easily and quickly rendered effective or ineffective by the operator as the condition of the road and the speed of the car varies, and even while effective the springs are permitted to absorb the minor shocks, substantially without interference.

While only one drum and band need be used, I have found the use of two, with the equalizer bar, to be advantageous.

I claim:

1. In a vibration absorber for vehicles having an axle and a chassis frame, the combination of a drum rigidly carried by the axle, a friction band extending substantially around the periphery of the drum, a connection between the band and chassis frame for oscillating the band around the drum as the frame oscillates toward and from the axle, a device connected to the band for tightening and loosening the same, and means connecting the device to the frame.

2. In a vibration absorber for vehicles having an axle and a chassis frame, the combination of a drum rigidly carried by the axle, a friction band extending substantially around the periphery of the drum, a connection between the band and chassis frame for oscillating the band around the drum as the frame oscillates toward and from the axle, a device connected to the band for tightening and loosening the same, and means adjustably connecting the device to the frame.

3. In a vibration absorber for vehicles having an axle and a chassis frame, the combination of a drum rigidly carried by the axle, a friction band extending substantially around the periphery of the drum, a lever connected at an end to one end of the band and at an intermediate point to the other end of the band, an arm rigidly carried by the band approximately 90° distant from the lever and extending generally in a horizontal direction, means connecting the arm to the chassis frame whereby vertical oscillation of the frame will oscillate the band around the drum, and means for adjustably connecting the other end of the lever to said chassis frame.

4. In a vibration absorber for vehicles having an axle and a chassis frame, the combination of a drum rigidly carried by the axle, a friction band extending substantially around the periphery of the drum, a lever connected at an end to one end of the band and at an intermediate point to the other end of the band, an arm rigidly carried by the band approximately 90° distant from the lever and extending generally in a horizontal direction, means connecting the arm to the chassis frame whereby vertical oscillation of the frame will oscillate the band around the drum, and means for connecting the other end of the lever to said chassis frame.

5. In a vibration absorber for vehicles having the usual running gear and body, the combination of a drum rigidly carried by the running gear, a friction band extending substantially around the periphery of the drum, a connection between the band and the body whereby oscillatory movement of the body will oscillate the band around the drum, and means carried by the body and connected to the band for tightening the band on the drum at will to resist the oscillatory movement.

6. In a vibration absorber for automobiles having the usual stationary rear axle casing and chassis frame, the combination of a drum rigidly carried by the rear axle casing, a friction band extending substantially around the periphery of the drum, a connection between the band and the chassis frame whereby oscillatory movement of the frame will oscillate the band around the drum, a lever arm connected to the ends of the band to tighten the band on the drum, and means connected between a distant portion of the chassis frame and the lever for tightening the band on the drum.

7. In a vibration absorber for automobiles having the stationary rear axle casing and chassis frame, the combination of a drum rigidly carried by the rear axle casing, a friction band, extending substantially around the periphery of the drum, a connection between the band and the chassis frame whereby oscillatory movement of the frame will oscillate the band around the drum, a lever arm connected to the ends of the band to tighten the band on the drum, means connected between a distant portion of the chassis frame and the lever for varying the friction between the band and the drum, and means for maintaining the said friction varying means in a plurality of different positions.

8. In a vibration absorber for automobiles having the usual stationary rear axle casing and a chassis frame, the combination of a drum adapted to be rigidly attached to the rear axle casing, a friction band extending substantially around the drum, a tightening lever arm pivotally connected at one of its extremities to one end of the band, means for pivotally connecting the other end of the band to the intermediate portion of the arm, a connection between the band and the chassis frame whereby movement of the frame will oscillate the band around the drum and means connected between an adjacent portion of the chassis frame and the other extremity of the arm for tightening the band on the drum at will.

9. In a vibration absorber for automobiles having the usual stationary rear axle casing and a chassis frame, the combination of a drum adapted to be rigidly attached to the rear axle casing, a friction band extending substantially around the drum, a tightening lever arm pivotally connected at one of its extremities to one end of the band, means for pivotally connecting the other end of the band to the intermediate portion of the arm, a connection between the band and the chassis frame whereby movement of the frame will oscillate the band around the drum and means connected to the other extremity of the arm for tightening the band on the drum to vary the friction at will, and means for maintaining said friction varying means in a plurality of operative positions.

10. In a vibration absorber for automobiles having a stationary rear axle casing and chassis frame, the combination of a drum mounted on the axle casing, a brake band extending substantially around the periphery of the drum, an arm rigidly connected to the band, a connection between the arm and the frame whereby vibratory movements of the frame will oscillate the band on the periphery of the drum, a lever arm pivotally connected at one end to one end of the brake band and at an intermediate portion to the other end of the band, said connection between an end of the band and the intermediate portion of the lever arm being adjustable to shorten or lengthen the effective connection, a link connected to the other or free end of the lever arm, and means for operating the link and holding it in a plurality of operative positions.

11. In a vibration absorber for automobiles having a stationary rear axle casing and chassis frame, the combination of a drum mounted on the axle casing, a brake band extending substantially around the periphery of the drum, an arm rigidly connected to the band, a connection between the arm and the frame whereby vibratory movements of the frame will oscillate the band on the periphery of the drum, a lever arm pivotally connected at one end to one end of the brake band, said lever arm having an aperture in its intermediate portion, the other end of the brake band having a threaded extension projecting through the aperture in the lever arm, a nut on said extension for securing the extension against removal from the arm, and for varying the effective length of the extension, a link connected to the other or free end of the lever arm, and means for operating the link and holding it in a plurality of operative positions.

12. In a vibration absorber for automobiles having a stationary rear axle casing and chassis frame, the combination of a drum mounted on the axle casing, a brake band extending substantially around the periphery of the drum, an arm rigidly connected to the band, a rod connected at one end to said arm with a universal joint and at the other end to the frame with a universal joint, a lever arm pivotally connected at one end to one end of the brake band and at an intermediate portion to the other end of the band, said connection to the intermediate portion being adjustable to vary the effective length of the band, a link connected to the other or free end of the lever arm, and means for operating the link at will to vary the friction between the band and drum.

13. In a vibration absorber for automobiles having a stationary rear axle casing and a chassis frame, the combination of a split drum rigidly clamped to the rear axle casing, a friction band extending substantially around the periphery of the drum, a connection between the band and the frame whereby oscillatory movement of the frame will oscillate the band along the periphery of the drum, and linkage connecting the band and frame for tightening the band on the drum to increase the resistance to oscillatory movement.

14. In a vibration absorber for automobiles having a stationary rear axle casing and chassis frame, the combination of a drum mounted on the axle casing, a brake band extending substantially around the periphery of the drum, an arm rigidly connected to the band, a connection between the arm and the frame whereby vibratory movements of the frame will oscillate the band on the periphery of the drum, a lever arm pivotally connected at one end to one end of the brake band and at an intermediate portion to the other end of the band, said connection between an end of the band and the intermediate portion of the lever arm being adjustable to shorten or lengthen the effective connection, a non-resilient connection between the other or free end of the lever arm and the chassis frame and adjustable on the frame to operate the lever.

15. In a vibration absorber for automobiles having a stationary rear axle casing and chassis frame, the combination of a drum mounted on the axle casing, a brake band extending substantially around the periphery of the drum, an arm rigidly connected to the band, a connection between the arm and the frame whereby vibratory movements of the frame will oscillate the band on the periphery of the drum, a lever arm pivotally connected at one end to one end of the brake band, said lever arm having an aperture in its intermediate portion, the other end of the brake band having a threaded extension projecting through the aperture in the lever arm, a nut on said extension for securing the extension against removal from the arm, and for varying the effective length of the extension, a connection between the other or free end of the lever arm and the frame and adjustable on the frame for operating the lever to tighten or loosen the band.

In witness whereof, I hereunto subscribe my signature.

THOMAS J. FAY.